US012422990B2

(12) United States Patent
Leong et al.

(10) Patent No.: US 12,422,990 B2
(45) Date of Patent: Sep. 23, 2025

(54) EXTENDED TRAINING FOR MEMORY

(71) Applicant: Advanced Micro Devices, Inc., Santa Clara, CA (US)

(72) Inventors: Alicia Wen Ju Yurie Leong, Austin, TX (US); Jayesh Hari Joshi, Austin, TX (US); William Robert Alverson, Del Valle, TX (US); Joshua Taylor Knight, Georgetown, TX (US); Jerry Anton Ahrens, Sister Bay, WI (US); Amitabh Mehra, Fort Collins, CO (US); Grant Evan Ley, Eden, UT (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/146,538

(22) Filed: Dec. 27, 2022

(65) Prior Publication Data
US 2024/0211142 A1  Jun. 27, 2024

(51) Int. Cl.
*G06F 3/06*  (2006.01)

(52) U.S. Cl.
CPC .......... *G06F 3/0613* (2013.01); *G06F 3/0634* (2013.01); *G06F 3/0673* (2013.01)

(58) Field of Classification Search
CPC ..... G06F 3/0613; G06F 3/0634; G06F 3/0673
USPC ........................................................ 711/154
See application file for complete search history.

(56) References Cited

U.S. PATENT DOCUMENTS

| | | | | |
|---|---|---|---|---|
| 9,633,570 B2* | 4/2017 | Peterson | ................ | G09B 7/00 |
| 10,559,335 B2* | 2/2020 | Kim | ................ | G11C 7/20 |
| 11,320,885 B2* | 5/2022 | Wang | ................ | G06F 1/3225 |
| 2004/0221239 A1* | 11/2004 | Hachigian | ................ | G09B 7/02 |
| | | | | 715/708 |
| 2006/0271773 A1* | 11/2006 | Marquiz | ................ | G06F 11/2294 |
| | | | | 713/1 |
| 2008/0104386 A1* | 5/2008 | Van Rooyen | ................ | G06F 9/4401 |
| | | | | 713/2 |
| 2010/0082967 A1* | 4/2010 | Lo | ................ | G11C 29/50012 |
| | | | | 711/E12.001 |
| 2011/0016214 A1 | 1/2011 | Jackson | | |
| 2013/0198502 A1* | 8/2013 | Rothman | ................ | G06F 9/4406 |
| | | | | 713/2 |
| 2013/0275739 A1* | 10/2013 | Kim | ................ | G06F 9/4401 |
| | | | | 713/100 |
| 2014/0047227 A1* | 2/2014 | Breternitz | ................ | G06F 9/5066 |
| | | | | 713/2 |
| 2017/0087410 A1* | 3/2017 | Cone | ................ | G16H 40/67 |
| 2018/0095806 A1* | 4/2018 | Aneja | ................ | G06F 11/00 |
| 2019/0004825 A1* | 1/2019 | Rangarajan | ................ | G06F 9/44505 |

(Continued)

OTHER PUBLICATIONS

Knight, Joshua Taylor, et al., "US Application as Filed", U.S. Appl. No. 17/732,987, filed Apr. 29, 2022, 41 pages.

(Continued)

*Primary Examiner* — Christopher B Shin

(74) *Attorney, Agent, or Firm* — FIG. 1 Patents

(57) ABSTRACT

Extended training for memory is described. In accordance with the described techniques, a training request to train a memory with extended training is received. The extended training corresponds to a longer amount of time than a default training. The extended training of the memory is performed using a set of target memory settings. In one or more implementations, the extended training is performed during a boot up phase of the computing device.

20 Claims, 7 Drawing Sheets

(56) References Cited

U.S. PATENT DOCUMENTS

| | | | |
|---|---|---|---|
| 2019/0122745 A1* | 4/2019 | Kim | G11C 29/1201 |
| 2020/0043362 A1* | 2/2020 | Vlaskamp | G09B 7/00 |
| 2020/0097201 A1 | 3/2020 | Irshad et al. | |
| 2021/0064390 A1* | 3/2021 | Park | G06N 5/02 |
| 2021/0081127 A1 | 3/2021 | Xiao et al. | |
| 2021/0373642 A1* | 12/2021 | Wang | G06F 9/4411 |
| 2022/0039197 A1* | 2/2022 | Dao | H04L 41/5019 |
| 2022/0113881 A1 | 4/2022 | Roberts | |
| 2022/0197832 A1 | 6/2022 | Ruttenberg et al. | |
| 2023/0061291 A1* | 3/2023 | Nealis | G06F 8/63 |
| 2023/0214141 A1* | 7/2023 | Chien | G06F 3/0673 |
| | | | 711/105 |
| 2023/0215475 A1* | 7/2023 | Chien | G11C 7/1021 |
| | | | 365/193 |
| 2023/0289192 A1* | 9/2023 | Peterson | G06F 9/4416 |
| 2023/0350715 A1 | 11/2023 | Knight et al. | |

OTHER PUBLICATIONS

"Non-Final Office Action", U.S. Appl. No. 17/732,987, filed Nov. 22, 2024, 27 pages.

"Final Office Action", U.S. Appl. No. 17/732,987, filed May 14, 2025, 17 pages.

* cited by examiner

EXTENDED TRAINING FOR MEMORY

BACKGROUND

Memory, such as random-access memory (RAM), stores data that is used by the processor of a computing device. When such a computing device is powered up, the memory is trained, which includes performing training operations in the memory and making the memory available for use by various components of the computing device.

DETAILED DESCRIPTION

Overview

Figure 1:
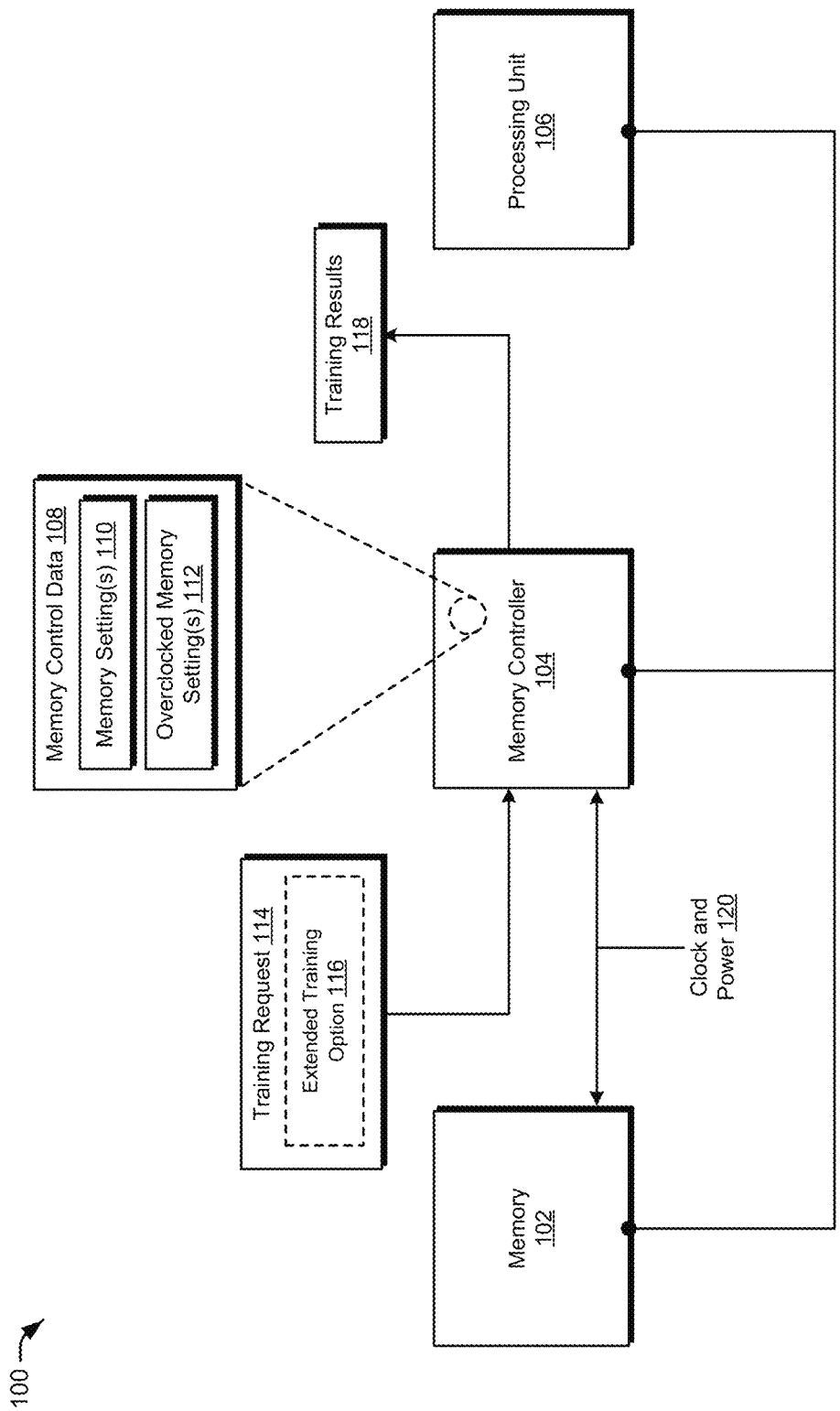
FIG. 1 is a block diagram of a non-limiting example system having a memory and a memory controller operable to implement extended training for memory.

Conventional systems place a constraint on the amount of time available to train a memory while booting up those systems. For example, the amount of training and refinement of a memory to operate with target memory settings (e.g., overclocked memory settings) is often dependent on a boot time metric. As such, the quality of the training is limited by what is determined to be an acceptable boot time, e.g., 30 seconds or less. These time constraints prevent the memory from operating at its full potential with desired memory settings (e.g., overclocked memory settings) because the training loses out on margin as it tries to optimize the memory in a limited training window.

Extended training for memory is described. The described techniques extend an amount of time that is available for training the memory, as compared to a default training mode. In accordance with the described techniques, a training request to train a memory with extended training is received. The extended training corresponds to a longer amount of time than a default training. In one or more implementations, a user interface is provided which enables the user to select the default training mode (which takes less time) or the extended training mode (which takes more time). In at least one variation, the extended training takes more time than the default training because the extended training extends an amount of time at least one training operation is performed relative to default training and/or because the extended training performs at least one additional and/or different training operation relative to the default training. With extended training, there is more time during a boot-up phase to configure the memory (and/or the controller and/or memory interfaces) to operate according to target memory settings, e.g., overclocked memory settings. Thus, the user is able to select the extended training mode in cases where more time is available for training in order to more reliably achieve target memory settings, or the default mode if time is limited. In one or more implementations, the extended training of the memory is performed to enable the memory to operate with a set of target memory settings, e.g., which include at least one overclocked memory setting in one or more scenarios. Notably, the longer training time of the extended training enables the system to improve a signal integrity for reading data from and writing data to the memory in order to operate the memory according to the target settings. For example, the longer training time improves signal integrity parameters, such as reference voltage (Vref), delays, and equalization.

In some aspects, the techniques described herein relate to a computing device including: a memory, and a memory controller configured to: receive a training request to train a memory with extended training, the extended training corresponding to a longer amount of time than a default training, and perform the extended training of the memory using a set of target memory settings.

In some aspects, the techniques described herein relate to a computing device, wherein the memory controller is configured to perform the extended training during a boot up phase of the computing device.

In some aspects, the techniques described herein relate to a computing device, wherein the memory controller is further configured to cause the memory to operate using the set of target memory settings.

In some aspects, the techniques described herein relate to a computing device, wherein the memory controller is further configured to communicate one or more change signals to cause the memory to operate using the set of target memory settings.

In some aspects, the techniques described herein relate to a computing device, wherein the default training includes a first set of operations to train the memory, and wherein the extended training includes a second set of operations to train the memory, wherein the second set of operations includes more operations than the first set of operations.

In some aspects, the techniques described herein relate to a computing device, wherein the set of target memory settings includes at least one overclocked memory setting for operating the memory in an overclocked mode.

In some aspects, the techniques described herein relate to a system including: a memory, and a memory controller to: receive a training request, select, based on the training request, one of at least two training modes for training the memory, the at least two training modes including a default training mode and an extended training mode, train the memory using the selected training mode, and output training results based on the training, the training results including at least one overclocked memory setting with which the memory is operable to operate in an overclocked mode.

In some aspects, the techniques described herein relate to a system, wherein the memory controller performs a first set of operations while training the memory using the default training mode, and wherein the memory controller performs a second set of operations while training the memory using the extended training mode.

In some aspects, the techniques described herein relate to a system, wherein the extended training mode trains the memory for a longer period of time than the default training mode.

In some aspects, the techniques described herein relate to a system, wherein the memory controller selects the default training mode or the extended training mode based on a training request received responsive to user input selecting the default training mode or the extended training mode via a user interface.

In some aspects, the techniques described herein relate to a system, wherein the memory controller selects the default training mode or the extended training mode based on a training request received from an application.

In some aspects, the techniques described herein relate to a system, wherein the training request is received from the application responsive to the application being launched, installed, or updated.

In some aspects, the techniques described herein relate to a system, wherein the memory controller trains the memory using the selected training mode during a boot up process of the system.

In some aspects, the techniques described herein relate to a system, wherein the memory controller causes the memory to be operated using the at least one overclocked memory setting automatically responsive to the system advancing from a boot up phase to a working state.

In some aspects, the techniques described herein relate to a method including: receiving a training request to train a memory with extended training, the extended training corresponding to a longer amount of time than a default training, and performing the extended training of the memory using a set of target memory settings.

In some aspects, the techniques described herein relate to a method, further including displaying a user interface that includes an option to perform extended training on the memory, and wherein the training request is received responsive to user input to select the option to perform extended training on the memory.

In some aspects, the techniques described herein relate to a method, wherein the user interface enables a user to select from multiple different levels of extended training.

In some aspects, the techniques described herein relate to a method, wherein the user interface enables a user to enter an amount of time available for the extended training.

In some aspects, the techniques described herein relate to a method, further including outputting test results based on the extended training of the memory, the test results indicating a signal integrity improvement from the extended training of the memory for operating the memory with the set of target memory settings.

In some aspects, the techniques described herein relate to a method, wherein the extended training is performed during a boot up process.

FIG. 1 is a block diagram of a non-limiting example system 100 having a memory and a memory controller operable to implement extended training for memory. In particular, the system 100 includes memory 102, memory controller 104, and processing unit 106. In accordance with the described techniques, the memory 102, the memory controller 104, and the processing unit 106 are coupled to one another via one or more wired or wireless connections. Example wired connections include, but are not limited to, buses (e.g., a data bus), interconnects, through silicon vias, traces, and planes. Examples of a device or apparatus in which the system 100 is configured for integration include, but are not limited to, servers, personal computers, laptops, desktops, game consoles, set top boxes, tablets, smartphones, mobile devices, virtual and/or augmented reality devices, wearables, medical devices, systems on chips, and other computing devices or systems.

The memory 102 is a device or system that is used to store information, such as for immediate use in a device. In one or more implementations, the memory 102 corresponds to semiconductor memory where data is stored within memory cells on one or more integrated circuits. In at least one example, the memory 102 corresponds to or includes volatile memory, examples of which include random-access memory (RAM), dynamic random-access memory (DRAM), and static random-access memory (SRAM). Alternatively or in addition, the memory 102 corresponds to or includes non-volatile memory, examples of which include flash memory, read-only memory (ROM), programmable read-only memory (PROM), erasable programmable read-only memory (EPROM), electronically erasable programmable read-only memory (EEPROM), and non-volatile dual in-line memory modules (DIMM) (NVDIMM).

In one or more implementations, the memory 102 is configured as a dual in-line memory module (DIMM). A DIMM includes a series of dynamic random-access memory integrated circuits, and the modules are mounted on a printed circuit board. Examples of types of DIMMs include, but are not limited to, synchronous dynamic random-access memory (SDRAM), double data rate (DDR) SDRAM, double data rate 2 (DDR2) SDRAM, double data rate 3 (DDR3) SDRAM, double data rate 4 (DDR4) SDRAM, and double data rate 5 (DDR5) SDRAM. In at least one variation, the memory 102 is configured as a small outline DIMM (SO-DIMM) according to one of the above-mentioned SDRAM standards, e.g., DDR, DDR2, DDR3, DDR4, and DDR5. In one or more implementations, the memory 102 is low-power double data rate (LPDDR), also known as LPDDR SDRAM, and is a type of synchronous dynamic random-access memory. In variations, LPDDR consumes less power than other types of memory and/or has a form factor suitable for mobile computers and devices, such as mobile phones. Examples of LPDDR include, but are not limited to, low-power double data rate 2 (LPDDR2), low-power double data rate 3 (LPDDR3), low-power double data rate 4 (LPDDR4), and low-power double data rate 5 (LPDDR5). It is to be appreciated that the memory 102 is configurable in a variety of ways without departing from the spirit or scope of the described techniques.

The memory controller 104 manages the memory 102, including the communication of data to and from the memory 102. For example, the memory controller 104 manages the communication of data to the memory 102 from the processing unit 106 and the communication of data from the memory 102 to the processing unit 106, e.g., over a coupling between the memory 102 and the processing unit 106. As discussed above and below, the memory controller 104 also trains the memory 102 (e.g., during a boot up process). For example, the memory controller 104 trains the memory 102 by performing performance and/or stability tests of target settings (e.g., clock and/or power settings) according to which the memory 102 is or can be configured to operate. In at least one variation, such settings are specified in one or more memory profiles (not shown).

The processing unit 106 is a component that requests access to data from the memory 102 for performing one or more operations in relation to such data, e.g., in connection with executing an application (not shown). Examples of the processing unit include, but are not limited to, a central processing unit, a parallel accelerated processor (e.g., a graphics processing unit), a digital signal processor, a hardware accelerator, a microcontroller, a processing-in-memory (PIM) component, and a system on chip. In variations, different types of processing units are useable in the system in accordance with the described techniques.

In accordance with the described techniques, the memory controller 104 is illustrated having memory control data 108, which in this example includes one or more memory settings 110 and overclocked memory settings 112. In accordance with the described techniques, the overclocked memory settings 112 include at least one memory setting that is overclocked. In one or more scenarios, the memory 102 is trained to operate according to a set of target memory settings which do not include all overclocked settings, e.g., none of the target settings are overclocked or one or more of the target settings are overclocked. In other scenarios, however, all the target memory settings are overclocked. In one or more implementations, a memory setting that is "overclocked" exceeds a certified value of the setting. For example, a clock rate set to exceed the clock rate certified by a manufacturer of the memory 102 is "overclocked." By contrast, a memory setting that is not "overclocked" does not exceed the certified value of the setting, e.g., a clock rate that is not "overclocked" does not exceed the clock rate certified by a manufacturer of the memory 102. Broadly, use of at least one of overclocked memory settings 112 enables the memory 102 to operate in an overclocking mode.

In one or more implementations, the memory settings 110 and the overclocked memory settings 112 include various clock and/or power settings. Example settings include, but are not limited to, a data rate (e.g., megatransfers per second), a number of cycles between sending a column address to memory and the beginning of data in a response (e.g., CAS or tCAS), a minimum number of clock cycles to open a row and access a column (e.g., tRCD), a measure of latency between issuing a precharge command to idle or close open row and an activate command to open a different row (e.g., tRP), a minimum number of clock cycles between a row active command and issuing a precharge command (e.g., tRAS), an active to active delay time within the same bank group (e.g., tRRDL), an active to active delay time to a different bank group (e.g., tRRDS), a four active window time (e.g., tFAW), a write recovery time (e.g., tWR), a column address strobe (CAS) latency time (e.g., tAA), an active to active/refresh delay time (e.g., tRC), a refresh recovery delay time in a normal refresh mode (tRFC1), a refresh recovery delay time in a fine granularity refresh mode (tRFC2), a refresh recovery delay time in a same bank refresh mode (tRFCs), a write to read command delay second within a same bank group (tWTRL), a write to read command delay second within a different bank group (tWTRS), a read to precharge delay (tRTP), nominal power supply voltage (e.g., VDD), output stage drain power voltage (e.g., VDDQ), programming power voltage (e.g., VPP), and so forth. It is to be appreciated that the memory settings 110 and/or the overclocked memory settings 112 specify values for one or more of those settings and/or various other settings associated with operating memory without departing from the spirit or scope of the described techniques.

In one or more implementations, the memory control data 108 includes one or more memory profiles. Broadly, a memory profile specifies a set of values for the memory settings, such that in various scenarios a memory profile is limited to the memory settings 110 (e.g., a non-overclocked memory profile), includes a combination of the memory settings 110 and the overclocked memory settings 112 (e.g., an overclocked memory profile), or is limited to overclocked memory settings 112 (e.g., an overclocked memory profile). In variations, different memory profiles include a different set of settings (e.g., combinations of memory settings 110 and overclocked memory settings 112) that are configured for operating the memory 102 to improve performance in relation to some objective, such as high-bandwidth (e.g., for a productivity application), low latency (e.g., for gaming), reduced power usage, reduced thermal effects on the system 100 (or portions thereof), and so forth.

Based on one or more sets of those settings (e.g., combinations of memory settings 110 and overclocked memory settings 112), the memory controller 104 and/or another component of the system 100 (e.g., physical layer (PHY)) are configured to train the memory 102. For instance, the memory controller 104 and/or the other component of the system 100 (e.g., the physical layer) train the memory 102 prior to switching operation of the memory 102 from a first set of the settings to a second, different set of the settings, such as a set of settings that causes the system to operate in an overclocked mode (e.g., because the second set includes one or more overclocked memory settings 112). Alternatively or additionally, the second, different set of settings does not include overclocked settings or includes different overclocked settings from the first set of settings. In accordance with the described techniques, the memory controller 104 trains the memory 102 during a boot up process of the system so that the memory 102 can operate using one or more sets of the settings included in the memory control data 108.

As discussed above, and below the memory controller 104 trains the memory during a boot up phase of the system 100. This contrasts with conventional techniques which perform one or more stability tests of memory settings using an operating system (e.g., tools of the operating system) and/or using software after the operating system has been loaded. In variations, components of the memory controller 104 that control training of the memory are configured as firmware or intellectual property (IP) cores run on or otherwise accessible to the memory controller 104. As discussed in more detail below, by training the memory 102 during a boot up phase, the memory controller 104 is able to directly access the memory 102 and perform potentially destructive training operations (e.g., to the contents of the memory 102), which cannot be performed once an operating system is loaded.

In one or more implementations, the memory controller 104 is configured to train the memory 102 using at least two different training modes. The at least two different training modes include a default training mode, and at least one extended training mode. The memory controller 104, in one or more implementations, can be configured to toggle between the different training modes based on a training request 114. As discussed in more detail below, in one or more implementations, the training request 114 is received. For instance, the training request 114 is received responsive to user input selecting an option via a user interface to train the memory 102. In accordance with the described techniques, the training request 114 is depicted as including extended training option 116 that is associated with the extended training mode. The extended training option 116 is depicted with dashed lines in the illustrated example to indicate that performing extended training on the memory 102 is optional, in one or more variations. For instance, the memory controller 104 performs a default training of the memory 102 during the boot up process, unless an option is selected (e.g., by a user or by an application) to perform extended training.

In at least one variation, a user interface presents (e.g., displays) an option which a user can select to perform extended training on the memory 102. As discussed in relation to examples below, for instance, a user interface can include a control to initiate memory training and also include an additional control, which if selected, causes the memory controller 104 to perform extended training. In this way, if the additional control is not selected when the control to initiate the memory training is selected, the memory controller 104 selects the default training mode and performs a default (e.g., shorter period of time) training of the memory 102.

If the additional control is selected when the control to initiate the memory training is selected, however, the memory controller 104 selects the extended training mode and performs the extended (e.g., longer period of time) training. During the extended training, the memory controller 104 takes more time than the default training because the memory controller 104 extends an amount of time at least one training operation is performed on the memory 102 relative to default training and/or because the extended training performs at least one additional and/or different training operation on the memory 102 relative to the default training.

As noted above, the training request 114 can be triggered by an application in at least one scenario, such as when the application is launched, installed, updated, or switches to a different mode, for instance. Responsive to the training request 114, the system 100 is powered down and then a boot up process is performed, during which the memory 102 is trained by the memory controller 104 to operate using one or more sets of target memory settings (e.g., which can include combinations of memory settings 110 and overclocked memory settings 112).

Additionally or alternatively, in variations, the memory controller 104 supports multiple levels of extended training, such that subsequent levels correspond to more and/or longer training. In one example, for instance, a user interface for extended training for memory provides multiple extended training options 116, e.g. a 5-minute option, a 10-minute option, a 20-minute option, a 30-minute option, a 1-hour option, a 2-hour option, a 6-hour option, and so on. In this example, the options associated with longer time frames correspond to more training (e.g., additional and/or longer training operations) than options associated with less time frames. In another example, the user interface for extended training enables a user to enter an amount of time available for the extended training, e.g., 5 minutes, 10 minutes, 20 minutes, 1 hour, 5 hours, and so forth. Although amount of time is used as an example, different types of hierarchies are usable in variations to indicate more and less extended training, another example of which includes gold extended training (e.g., most amount of extended training), silver extended training (e.g., a middle amount of extended training), and bronze extended training (e.g., a least amount of extended training). Certainly, other various labeling schemes and numbers of levels of extended training are contemplated within the spirit and scope of the described techniques.

In the context of default training and extended training, the memory controller 104 is configured to train the memory 102 using a default set of techniques or algorithms during the default training. The default training is configured to take less time than the extended training. During extended training, the memory controller 104 is configured to perform additional training operations relative to the default training. Alternatively or in addition, the memory controller 104 is configured to perform training operations for a longer amount of time (i.e., extended amount of time) than during the default training, which results in more confidence or accuracy in information produced during the training and/or testing.

Examples of the one or more training operations the memory controller 104 and/or other component perform on the memory 102 during boot up to train the memory 102 to operate using various settings include, but are not limited to, one or more of performing reference voltage (Vref) and/or delay-locked loop (DLL) shmoos (e.g., to generate one or more "eye diagrams" of the memory 102 or portions of the memory 102), performing virtual timing and signal analysis (vTSA), adjusting different voltage and/or delay levels to generate visualization of memory data eyes for different bits of the memory, checking one or more portions of the memory 102 for rowhammering, and performing one or more RSC tests. Additionally or alternatively, the memory controller 104 or other component perform memory training according to one or more algorithms, such as one or more write leveling algorithms, one or more multi-purpose register (MPR) pattern write algorithms, one or more read centering algorithms, and/or one or more write centering algorithms.

Additionally or alternatively, the memory controller 104 performs more sweeps and/or training according to different algorithms for the memory 102. In one or more implementations, the memory controller 104 generates one or more eye diagrams of the memory 102 using a combination (e.g., a multidimensional combination) of reference voltage (Vref) and DLL shmoos. In at least one variation, the reference voltage (Vref) is shmooed to determine if the signal is a '1' or a '0' in connection with creating the memory eye diagrams. Based on the generated eye diagrams, for instance, the memory controller 104 obtains the margins at which the memory 102 is capable of performing given variations in the environment in which the memory 102 operates. In variations, different training operations are performed during the training (e.g., the default training or the extended training) of the memory 102 without departing from the described techniques. In accordance with the described techniques, by performing extended training the memory controller 104 or other component improves a signal integrity for reading data to and writing data from the memory 102 for operation according to the target settings. For example, the memory controller 104 and/or the other component improves signal integrity parameters through the extended training, such as reference voltage (Vref), delays, and equalization.

In at least one example, for instance, default training of the memory 102 includes performing reference voltage (Vref) and/or delay-locked loop (DLL) shmoos (e.g., to generate one or more "eye diagrams" of the memory 102 or portions of the memory 102). By way of contrast, in this example, extended training of the memory 102 includes performing more iterations of the reference voltage (Vref) and delay-locked loop (DLL) shmoos and/or also performing one or more additional sweeps, shmoos, and or different algorithms for the memory 102. Indeed, this is just one example to demonstrate a difference between default training and extended training, and various different combinations of training operations are performable during default and extended training in accordance with the described techniques.

By way of contrast to the described testing techniques, conventional approaches involve running one or more "stress tests" using software, such as via an operating system. Additionally, conventional approaches do not provide options to users to perform a default training (taking less time) or extended training (taking more time). Moreover, conventional stress tests can take several hours (up to days) to determine a stability of the system using particular settings. This is at least in part because the conventional tests are performed via software, which involves access (e.g., by an operating system) via one or more cores (of a processing unit), then access via data fabric of the system, and then access to the memory being stress tested—a slower path than a direct path to memory. Additionally, conventional stress tests are limited to determining the stability of the system for the environmental variables and workload at a time those tests are performed, but the tests do not guarantee that the system will perform stably in the long term, especially if operation of the memory approaches its margins.

In accordance with the described techniques, the memory controller 104 accesses the memory 102 directly when training the memory 102 to operate according to target memory settings. In other words, the training operations (e.g., algorithms) are run from the memory controller 104 directly into the memory 102. As a result, the training operations performed on the memory 102 to train it are faster than conventional stress tests. In order to perform one or more of the training operations during boot up, the memory controller 104 bypasses refreshes and other periodic background activities, which is unable to be performed in various scenarios where the system has already been booted up (e.g., when running software). Additionally, by performing the training during boot up by directly accessing the memory 102, the memory controller 104 avoids background latencies that occur with operating systems and/or other software after the system has booted up.

The illustrated example also depicts outputting training results 118. In one or more implementations, the training results 118 are indicative of the memory 102's response to the training during the boot up phase. By way of example, the training results 118 indicate signal integrity parameters, such as Vref, delays, equalization, and so on, identified during training which improve signal integrity so that the memory 102 can operate with the target memory settings. In at least one variation, the memory controller 104 causes the memory 102 to be operated using at least one set of settings for which the training was performed and indicated in the training results 118, e.g., automatically responsive to the system 100 advancing from a boot up phase to a working state.

Alternatively or additionally, the training results 118 include human-understandable information describing a response of the memory 102 during the default or the extended training, which is output (e.g., displayed) via a user interface. In variations, results of the one or more training operations predict a performance and/or a stability of the memory 102 over a subsequent time period if the memory 102 is configured to operate with a set of target memory settings, e.g., overclocked memory settings or memory settings that are not overclocked.

The illustrated example also depicts clock and power 120 inputs to the memory 102 and the memory controller 104. In accordance with the described techniques, the memory controller 104 and/or another component is configured to set the clock and power 120 inputs to cause the memory 102 to operate according to a set of memory settings (e.g., set of target memory settings), such as a set of overclocked memory settings 112 or of an overclocked memory profile (not shown).

For example, the memory controller 104 causes the memory 102 to operate according to a set of target memory settings by sending one or more change signals to a voltage generator (not shown) to adjust a supply voltage (e.g., VDD), such that the clock and power 120 inputs subsequently include the supply voltage as adjusted according to the change signals. Additionally or alternatively, the memory controller 104 sends a change signal to a reference clock generator (not shown) to change a frequency of a clock rate, such that the clock and power 120 inputs subsequently include a reference clock signal as adjusted according to the change signals. The memory controller 104 is operable to adjust the clock and power 120 inputs in various ways to produce the target settings specified, e.g., for operating the memory 102.

Figure 2:
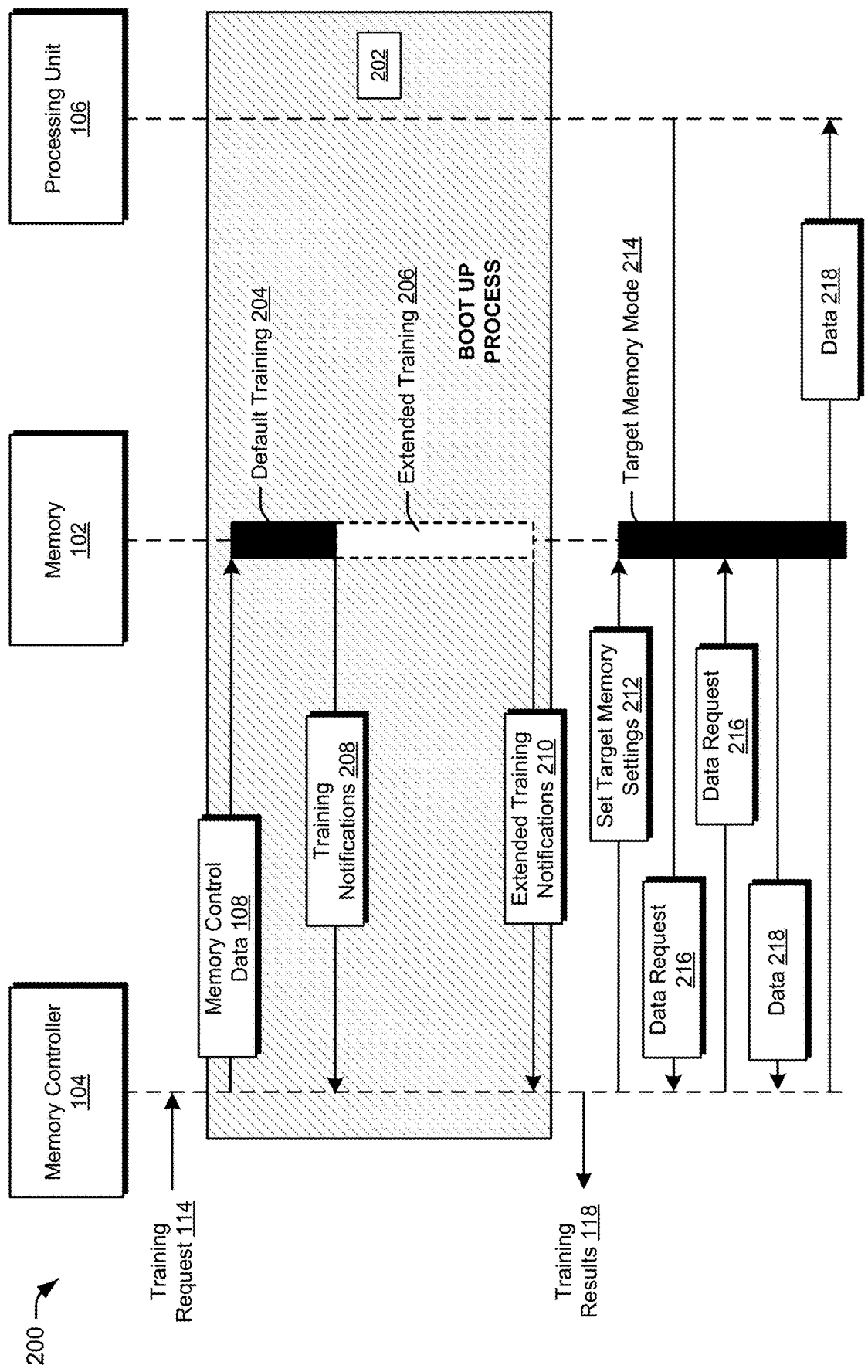
FIG. 2 depicts a non-limiting example in which the memory controller trains the memory and optionally performs an extended training of the memory.

FIG. 2 depicts a non-limiting example 200 in which the memory controller trains the memory and optionally performs an extended training of the memory. The example 200 includes the memory 102, the memory controller 104, and the processing unit 106.

The example 200 includes a variety of example communications and operations between the memory controller 104, the memory 102, and the processing unit 106 over time. In this example 200, the communications and operations are positioned vertically based on time, such that communications and operations closer to a top of the example occur prior to communications or operations further from the top of the example. It follows also that communications or operations closer to a bottom of the example occur subsequent to communications or operations further from the bottom. The example 200 also depicts various phases and/or states of the system 100 or portions of the system 100. These phases and/or states are also positioned in the example 200 vertically based on time, such that phases or states closer to a top of the example occur prior to phases, states, or communications further from the top.

Here, the illustrated example 200 depicts the memory controller 104 receiving the training request 114. In one or more implementations, the training request 114 is received based on user input, such as user input received via a displayed control (e.g., a button) to initiate training of the memory 102. As discussed above and below, in variations, the training request 114 also optionally includes an indication that the extended training option 116 is selected, such as responsive to additional user input selecting the extended training option 116 or an application providing instructions to the memory controller 104 which indicate selection of the extended training option 116.

The illustrated example 200 also depicts a boot up phase 202 of the system 100. In one or more implementations, the system 100 enters the boot up phase 202 based on receipt of the training request 114. Although a powered off phase is not depicted, in one or more such implementations, the system 100 is powered off based on the training request 114, and then the system 100 is triggered to boot up. During a powered off phase, the system 100 (and the memory 102) is powered off, examples of which include a soft off (e.g., G2/S5 state as specified by Advanced Configuration and Power Interface (ACPI)) and a mechanical off (e.g., G3 state as specified by ACPI), which require a reboot to return to a working state (e.g., G0/S0 state as specified by ACPI). During the boot up phase 202, the system 100 performs various operations, such as hardware initializations, to advance the system 100 to a working state.

In accordance with the described techniques, the boot up phase 202 includes training of the memory 102. In one or more scenarios, such training is limited to default training 204, e.g., based on the training request 114 not including the extended training option 116 or not having the extended training option 116 selected. In other scenarios, the training includes extended training 206 in addition to the default training 204, e.g., based on the training request 114 including the extended training option 116 or having the extended training option 116 selected. The illustrated example 200 depicts the memory controller 104 providing the memory control data 108 to the memory 102, e.g., for the default training 204 or for both the default training 204 and the extended training 206. By way of example, the memory controller 104 trains the memory 102 during the boot up phase 202 with the memory control data 108, such as by training the memory 102 to operate according to one or more sets of target memory settings. In at least one scenario, a target set of memory settings includes at least one overclocked memory setting 112.

As noted above, when performing the default training the memory controller 104 performs a first set of training operations on the memory, some examples of which are described above. This first set of tests includes fewer and/or less thorough training operations than the extended training 206. However, it takes the memory controller 104 more time to perform the extended training 206 (and the default training 204) than it takes the memory controller 104 to perform just the default training 204. To this end, when performing the extended training 206, the memory controller performs a second set of training operations on the memory, examples of which are also described above. In one or more implementations, the second set includes one or more of the same types of training operations as the first set (or all of them), but the training operations are performed for a longer amount of time than those of the first set, which improves signal integrity for read/write operations of the memory and/or enables a more accurate prediction of how the memory 102 will operate under a target set of settings. Additionally or alternatively, performing the training operations for a longer amount of time enables a more accurate prediction of performance of the memory 102 and/or a more accurate prediction of stability margins of the memory 102's operation. Alternatively or additionally, the second set includes additional training operations relative to the first set performed for the default training 204.

The illustrated example 200 also depicts training notifications 208 and extended training notifications 210. As the memory controller 104 performs the default training 204 on the memory 102, the memory controller 104 receives the training notifications 208 (e.g., signals), which indicate a response of the memory 102 to the training operations performed as part of the default training 204 during the boot up phase 202 of the system 100. For instance, as the memory controller 104 performs reference voltage (Vref) and/or DLL shmoos in the memory 102, the memory controller 104 receives training notifications 208 indicative of operation of the memory 102 and/or margins of its operation, under various combinations of voltage and/or delay levels.

Similarly, as the memory controller 104 performs the extended training 206 on the memory 102, the memory controller 104 receives the extended training notifications 210 (e.g., signals), which indicate a response of the memory 102 to the training operations performed as part of the extended training 206 also during the boot up phase 202 of the system 100. For instance, as the memory controller 104 performs more thorough training operations (e.g., more iterations) than during the default training 204, such as more thorough versions of the reference voltage (Vref) and/or DLL shmoos in the memory 102, the memory controller 104 receives extended training notifications 210 indicative of operation of the memory 102 and/or margins of its operation, under even more combinations of voltage and/or delay levels.

Alternatively or additionally, as the memory controller 104 performs additional training operations than during the default training 204—such as more sweeps and/or training different algorithms in the memory 102—the memory controller 104 receives extended training notifications 210 indicative of operation of the memory 102 and/or margins of its operation during those operations. Regarding operations performed during the default training 204 and/or the extended training 206, it is to be appreciated that in variations different training operations (or combinations of them) than described herein are performable without departing from the spirit or scope of the described techniques.

In one or more implementations, the memory controller 104 determines the training results 118 based on the training notifications 208 (e.g., signals) received from the memory 102 during the default training 204 and/or based on the extended training notifications 210 (e.g., signals) received from the memory 102 during the extended training notifications 210. In one or more implementations, the training results 118 indicate an improvement in signal integrity due to the extended training 206, e.g., for operating the memory 102 with the target settings. In at least one variation, the memory controller 104 outputs the training results 118, which causes the memory 102 to operate according to target memory settings relative to which the extended training 206 is performed, e.g., including one or more of the overclocked memory settings 112.

For example, the memory controller 104 causes the memory 102 to operate according to such target memory settings by sending one or more change signals to a voltage generator (not shown) to adjust a supply voltage (e.g., VDD), such that the clock and power 120 inputs subsequently include the supply voltage as adjusted according to the change signals. Additionally or alternatively, the memory controller 104 sends a change signal to a reference clock generator (not shown) to change a frequency of a clock rate, such that the clock and power 120 inputs subsequently include a reference clock signal as adjusted according to the change signals.

Additionally or alternatively, the memory controller 104 outputs the training results 118 by communicating them to software (e.g., via a handshake), such as to an operating system (not shown). Alternatively or additionally, an operating system further provides the training results 118 to an application running on the operating system, such as to a memory management application. In accordance with the described techniques, the training results 118 (or portions of them) are output (e.g., displayed) in a human-understandable format via a user interface, such as via a user interface of an operating system and/or a user interface of a memory management application. Examples of formats in which the training results 118 are output include, but are not limited to, numerical scores, stop-light icons, text labels describing operation of memory during the training or predicted operation of memory over time with target memory settings, graphical icons, graphs or charts depicting a performance and/or stability (or some other characteristic) of the memory 102 over time if the memory is configured to operate with the target memory settings indicated in the training results 118, and one or more visualizations of generated eye diagrams, to name just a few. In variations, the training results 118 are output in different human-understandable ways indicative of the memory 102's response for operating with target settings without departing from the spirit or scope of the described techniques.

Additionally or alternatively, the training results 118 can include or be used to generate a recommendation for output. In one variation, for instance, such a recommendation recommends that a user select one or more sets of target memory settings (e.g., profiles) for operating the memory 102 and/or not select one or more other sets of one or more sets of target memory settings (e.g., because they are predicted to cause unstable operation of the memory 102 or a negligible increase in the performance of the memory 102). Additionally or alternatively, a software application (e.g., a memory management application) creates and causes output (e.g., display) of a notification after a threshold amount of time (e.g., a number of minutes, hours, days, months, etc.) reminding a user of the system 100 to perform an extended training with one or more sets of memory settings (e.g., including one or more overclocked memory settings).

Also in this example 200, the memory controller 104 provides one or more set target memory settings 212 signals to the memory 102 to cause the memory 102 to operate according to a target memory mode 214, which includes target memory settings trained via the default training 204 and/or the extended training 206. As discussed above and below, those target memory settings include overclocked memory settings in one or more scenarios.

While the memory 102 is depicted operating in the target memory mode 214, the memory 102 receives data requests 216 originating from the processing unit 106 and provides data 218 to the processing unit 106 for servicing those requests, in accordance with the described techniques. In particular, the memory controller 104 receives one or more data requests 216 from the processing unit 106 and the memory controller 104 schedules the data request 216 to the memory 102. The memory controller 104 then accesses (e.g., reads from) a portion of the memory 102 corresponding to the data request 216 (e.g., to retrieve respective data 218). The memory controller 104 then provides the respective data 218 to the processing unit 106. This process of requesting data, retrieving data from the memory 102 (e.g., reading the data from the memory 102), and providing the data read back to the processing unit 106, is performed while the memory 102 operates according to the target memory mode 214. In accordance with the described techniques, the processing unit 106 can also cause the memory controller 104 to write data to the memory 102 while operating in the target memory mode 214.

In the context of user interfaces for extended training for memory, consider the following discussion of FIGS. 3-6.

Figure 3:
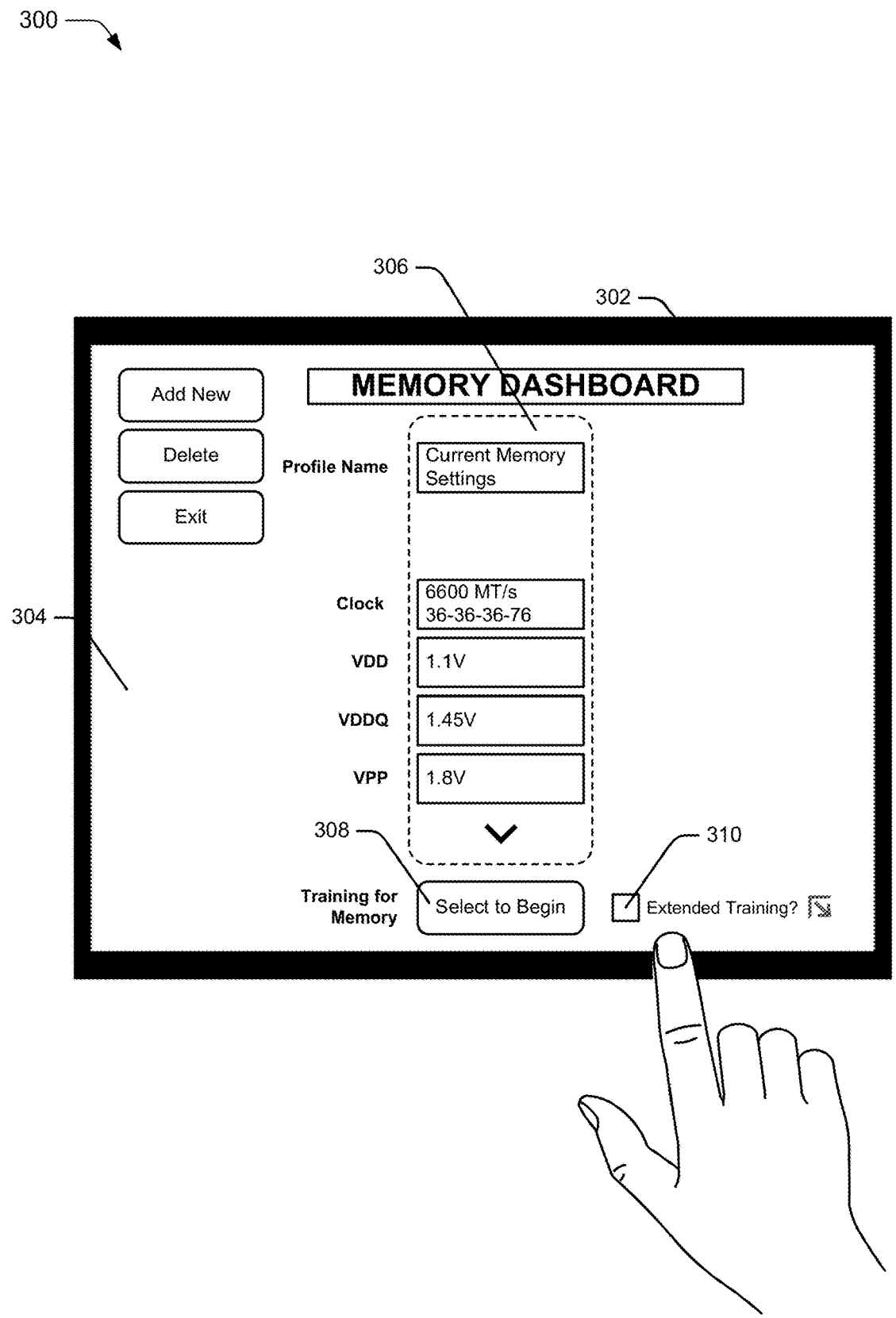
FIG. 3 depicts a non-limiting example of a user interface in one or more implementations.

FIG. 3 depicts a non-limiting example 300 of a user interface in one or more implementations. The example 300 includes a display device 302 outputting a memory management user interface 304.

In the illustrated example 300, the user interface 304 is depicted displaying a set of memory settings 306 according to which the memory 102 is operable. In this example 300, the user interface 304 includes a control 308, which is selectable (e.g., via user input) to initiate training of the memory 102. The user interface 304 also includes an additional control 310. In this example 300, the additional control 310 is depicted unselected. When the additional control 310 is selected, however, it indicates to perform extended training on the memory 102, e.g., selection of the additional control 310 causes the training request 114 to include the extended training option 116 selected.

In one or more implementations, receipt of user input in relation to the control 308 corresponds to or triggers the training request 114, which causes the system 100 to train the memory 102, e.g., by performing one or more training operations on the memory 102 as described above and below during the boot up phase 202. In scenarios where user input is received to select the control 308 and the additional control 310 is not selected, the training request 114 does not include the extended training option 116, and the memory controller 104 performs the default training 204 on the memory 102 during the boot up phase 202.

In one or more implementations, the user interface 304 allows a user to provide user input to manually adjust one or more settings according to which the memory 102 operates. Indeed, it is to be appreciated that in variations, user interfaces for extended training for memory are configured in different ways without departing from the spirit or scope of the described techniques. Consider the following example in which the option to perform the extended training is selected.

Figure 4:
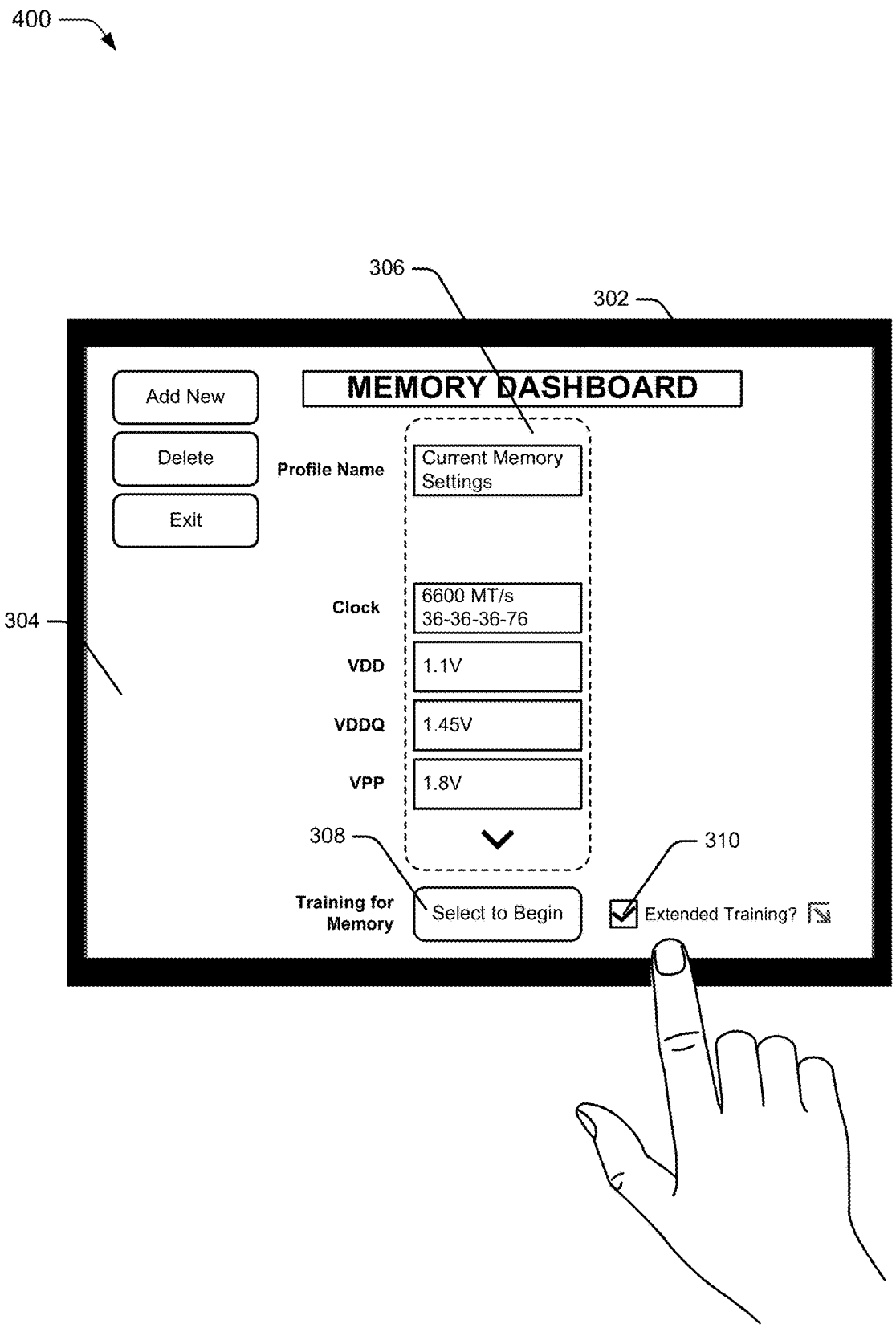
FIG. 4 depicts a non-limiting example of a user interface in one or more implementations.

FIG. 4 depicts a non-limiting example 400 of a user interface in one or more implementations. The example 400 includes the display device 302 outputting the memory management user interface 304.

In contrast to the example 300, in the example 400, the additional control 310 is depicted having been selected. In scenarios where user input is received to select the control 308 and the additional control 310 is selected, the training request 114 includes or otherwise indicates selection of the extended training option 116, and the memory controller 104 performs the extended training 206 (and also the default training 204 in at least one variation) on the memory 102 during the boot up phase 202. As noted above, the extended training 206 corresponds to a longer amount of time than the default training 204—in some variations the extended training 206 includes the default training 204 as well as one or more additional training operations (e.g., tests). In the context of a user interface which presents different extended training, consider the following discussion of FIG. 5.

Figure 5:
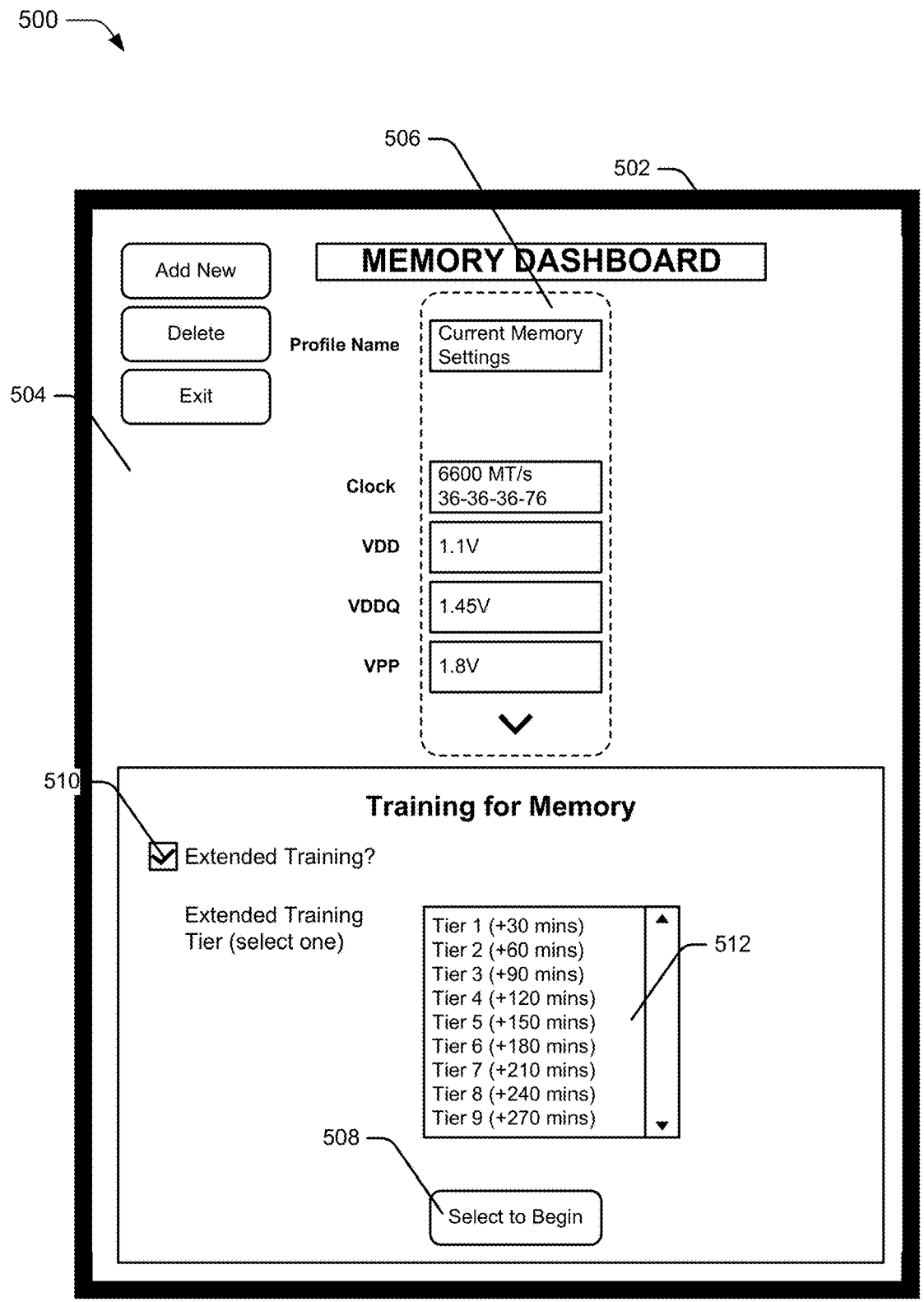
FIG. 5 depicts a non-limiting example of a user interface in one or more implementations.

FIG. 5 depicts a non-limiting example 500 of a user interface in one or more implementations. The example 500 includes a display device 502 outputting a memory management user interface 504.

In the illustrated example 500, the user interface 504 is depicted displaying a set of memory settings 506 according to which the memory 102 is operable. In this example 500, the user interface 504 includes a control 508, which is selectable (e.g., via user input) to initiate training of the memory 102. The user interface 504 also includes an additional control 510. In this example 500, the additional control 510 is depicted selected. When the additional control 510 is selected, it indicates to perform extended training on the memory 102, e.g., selection of the additional control 510 causes the training request 114 to include the extended training option 116 and the memory controller 104 to perform the extended training 206. In scenarios where user input is received to select the control 508 and the additional control 510 is selected, the training request 114 includes or indicates selection of the extended training option 116, and the memory controller 104 performs the extended training 206 on the memory 102 during the boot up phase 202.

In this example 500, the user interface 504 also includes an extended training tier control 512. In one or more implementations, the described techniques allow a user to select one of multiple levels of extended training, such that different levels correspond to extended training (e.g., a number of additional operations or extensions of training operations) that takes more or less time than other levels of the extended training (e.g., more or less time than the operations of those other levels). Based on selection of a particular tier or level of extended training, the training operations corresponding to the selected tier or level are performed during the extended training 206.

Figure 6:
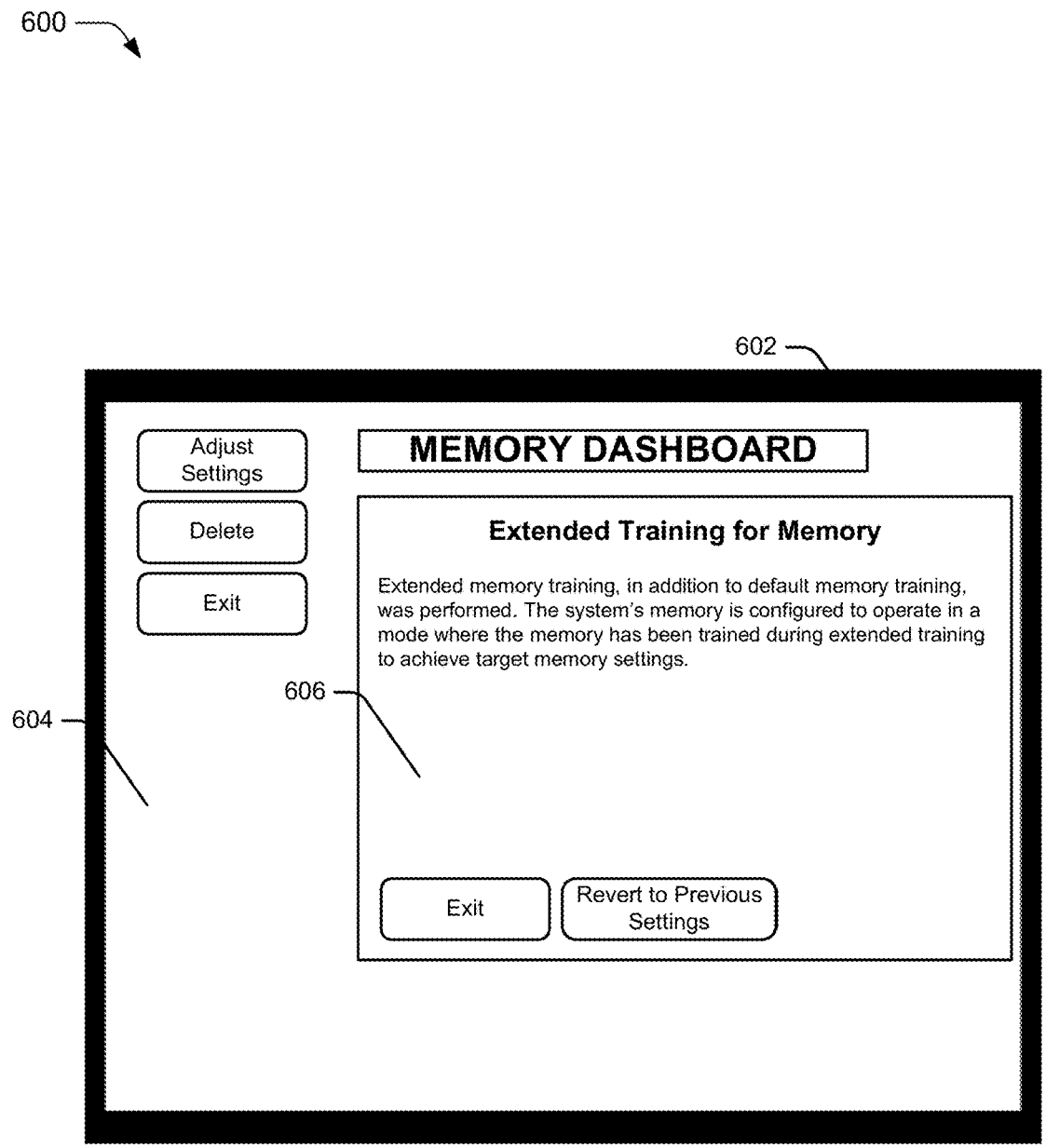
FIG. 6 depicts a non-limiting example of a user interface in one or more implementations.

FIG. 6 depicts a non-limiting example 600 of a user interface in one or more implementations. The example 600 includes a display device 602 outputting a memory management user interface 604.

In the illustrated example 600, the user interface 604 is depicted displaying a notification 606 indicating that extended training 206 of the memory 102 has been performed, e.g., instead of or in addition to the default training 204. In one or more implementations, such a notification is displayed after the boot up phase 202 of the system and when the system 100 returns to a working state (e.g., G0/S0 state as specified by ACPI).

As discussed above, for instance, the training results 118 are provided to an application (e.g., a memory management application) in one or more variations, and information in the training results 118 enables the application to display the notification 606 via its user interface 604. It is to be appreciated that the notification 606 is just one example and, in variations, different information is displayable after extended training for memory is performed by the system 100 and the system returns from the boot up phase 202 to a working state.

Having discussed example systems and user interfaces for extended training for memory, consider the following example procedures.

Figure 7:
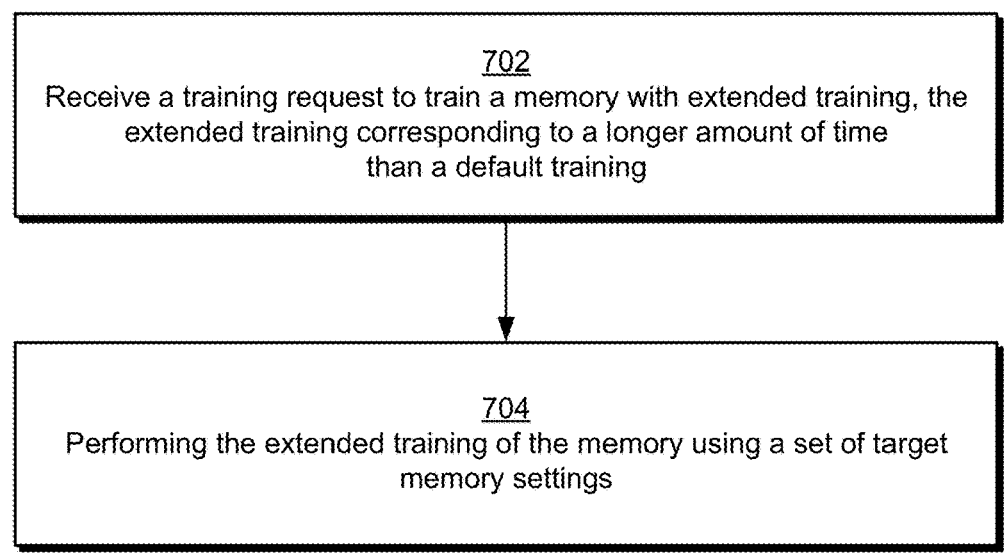
FIG. 7 depicts a procedure in an example implementation of extended training for memory.

FIG. 7 depicts a procedure in an example 700 implementation of extended training for memory.

A training request to train a memory with extended training is received (block 702). In accordance with the principles discussed herein, the extended training corresponds to a longer amount of time than a default training. By way of example, the memory controller 104 receives a training request 114 to train a memory 102. For instance, the training request 114 is received responsive to user input selecting an option via a user interface to train the memory 102. The training request 114 includes an extended training option 116 that is associated with the extended training mode. In one or more implementations, the memory controller 104 performs a default training of the memory 102 during the boot up process, unless an option is selected (e.g., by a user or by an application) to perform extended training. In at least one variation, a user interface presents (e.g., displays) an option which a user can select to perform extended training on the memory 102. For example, a user interface can include a control to initiate memory training and also include an additional control, which if selected, causes the memory controller 104 to perform extended training. In this way, if the additional control is not selected when the control to initiate the memory training is selected, the memory controller 104 selects the default training mode and performs a default (e.g., shorter period of time) training of the memory 102. If the additional control is selected when the control to initiate the memory training is selected, however, the memory controller 104 selects the extended training mode and performs the extended (e.g., longer period of time) training.

The extended training of the memory is performed using a target set of memory settings (block 704). By way of example, the memory controller 104 performs the extended training of the memory 102 using a set of memory settings 110 that includes at least one overclocked memory setting 112. During the extended training, the memory controller 104 performs at least one additional training operation on the memory 102 and/or performs at least one training operation for a longer amount of time than during default training. As noted above, the training request 114 can be triggered by an application in at least one scenario, such as when the application is launched, installed, changes modes, or updated, for instance. Responsive to the training request 114, the system 100 is powered down and then a boot up process is performed, during which one or more sets of memory settings (e.g., which can include combinations of target memory settings 110 and target overclocked memory settings 112) are trained by the memory controller 104 and/or one or more of its various components.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the memory 102, the memory controller 104, the processing unit 106) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A computing device comprising:
a memory; and
a processor to execute an application configured to:
display a user interface having:
an option that is selectable to train the memory with an extended training instead of a default training; and
a control that is selectable to define an additional amount of time for performing the extended training relative to the default training;
responsive to selection of the option via the user interface, request a memory controller to perform the extended training of the memory over a duration defined by the additional amount of time specified via the user interface control using a set of target memory settings; and
display, after the extended training, training results via the user interface that indicate a response of the memory to the extended training.

2. The computing device of claim 1, wherein the memory controller is configured to perform the extended training during a boot up phase of the computing device.

3. The computing device of claim 1, wherein the memory controller is configured to cause the memory to operate using the set of target memory settings.

4. The computing device of claim 1, wherein the memory controller is configured to communicate one or more change signals to cause the memory to operate using the set of target memory settings.

5. The computing device of claim 1, wherein the set of target memory settings includes at least one overclocked memory setting for operating the memory in an overclocked mode.

6. A system comprising:
a memory; and
a processor to execute an application to:
  display a user interface having:
    an option that is selectable to toggle between one of at least two training modes for training the memory, the at least two training modes including a default training mode and an extended training mode; and
    a control that is selectable to define an additional amount of time for performing the extended training mode relative to an amount of time for performing the default training mode;
  based on a selection of the option and input to the control via the user interface, request a memory controller to train the memory using the extended training mode, during a boot up process, over a duration defined by the additional amount of time specified via the input to the control; and
  output, after the boot up process, training results based on the training via the user interface, the training results including at least one overclocked memory setting with which the memory is operable to operate in an overclocked mode.

7. The system of claim 6, wherein the memory controller performs a first set of operations while training the memory using the default training mode, and wherein the memory controller performs a second set of operations while training the memory using the extended training mode, wherein the second set of operations includes more operations than the first set of operations.

8. The system of claim 6, wherein the memory controller is further configured to select the extended training mode based on a training request received from a requesting application.

9. The system of claim 8, wherein the training request is received from the requesting application responsive to the application being launched, installed, or updated.

10. The system of claim 6, wherein the memory controller trains the memory using the extended training mode during the boot up process by directly accessing the memory to perform at least one training operation that is destructive to content of the memory.

11. The system of claim 6, wherein the memory controller is further configured to cause the memory to be operated using the at least one overclocked memory setting automatically responsive to the system advancing from a boot up phase to a working state.

12. A method comprising:
displaying a user interface that includes:
  an option that is selectable to train a memory with an extended training instead of a default training; and
  a control that is selectable to define an additional amount of time for performing the extended training relative to the default training;
responsive to receiving a selection of the option via the user interface, requesting a memory controller to perform the extended training of the memory over a duration defined by the additional amount of time specified via the user interface control using a set of target memory settings; and
after the extended training, displaying training results via the user interface that indicate a response of the memory to the extended training.

13. The method of claim 12, wherein the user interface control includes descriptions of multiple different levels of extended training, wherein each of the multiple different levels of extended training are associated with different amounts of additional time.

14. The method of claim 12, wherein the user interface control enables a user to enter an amount of time available for the extended training, the method further comprising defining the additional amount of time for the extended training based on the amount of time entered via the user interface control.

15. The method of claim 12, wherein the training results indicate a signal integrity improvement from the extended training of the memory for operating the memory with the set of target memory settings.

16. The computing device of claim 1, wherein the memory controller is configured to perform the default training of the memory unless user input is received via the user interface selecting the option.

17. The computing device of claim 1, wherein the memory controller is configured to perform at least one training operation for the set of target memory settings for a longer time during the extended training than during the default training to improve a signal integrity for reading data to and writing data from the memory when operating using the set of target memory settings.

18. The computing device of claim 1, wherein the user interface control includes a plurality of extended training options that each correspond to different selectable amounts of time, wherein the additional amount of time corresponds to a selected one of the plurality of extended training options.

19. The computing device of claim 1, wherein the memory controller is configured to perform at least one training operation for a longer time during the extended training than during the default training to use the longer time for additional prediction of one or more stability margins when operating the memory with the set of target memory settings.

20. The system of claim 6, wherein the user interface control includes descriptions of multiple different levels of extended training, wherein each of the multiple different levels of extended training are associated with different amounts of additional time presented in the user interface.

* * * * *